(12) United States Patent
Takashima et al.

(10) Patent No.: US 8,028,636 B2
(45) Date of Patent: Oct. 4, 2011

(54) STERN SHAPE OF DISPLACEMENT-TYPE MARINE VESSEL

(75) Inventors: Reiko Takashima, Nagasaki (JP);
Makoto Nishigaki, Nagasaki (JP);
Toshinobu Sakamoto, Nagasaki (JP);
Naoki Ueda, Tokyo (JP); Kenichi Yamamoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 27 days.

(21) Appl. No.: 12/310,232

(22) PCT Filed: Jan. 30, 2008

(86) PCT No.: PCT/JP2008/051389
§ 371 (c)(1), (2), (4) Date: Feb. 18, 2009

(87) PCT Pub. No.: WO2008/099672
PCT Pub. Date: Aug. 21, 2008

(65) Prior Publication Data
US 2009/0320731 A1    Dec. 31, 2009

(30) Foreign Application Priority Data
Feb. 13, 2007  (WO) .................. PCT/JP2007/052500

(51) Int. Cl.
*B63B 1/08* (2006.01)
(52) U.S. Cl. ........................................................ 114/57
(58) Field of Classification Search .................. 114/57, 114/61.28, 62, 66, 71
See application file for complete search history.

(56) References Cited

U.S. PATENT DOCUMENTS

| | | | | |
|---|---|---|---|---|
| 3,416,480 A | * | 12/1968 | Pien | 114/57 |
| 3,635,186 A | | 1/1972 | German | |
| 3,680,513 A | * | 8/1972 | Klasic | 114/57 |
| 3,930,456 A | * | 1/1976 | Ludvigsson | 114/57 |
| 3,983,829 A | | 10/1976 | Bunyan et al. | |
| 3,991,696 A | * | 11/1976 | Aoki | 114/57 |

(Continued)

FOREIGN PATENT DOCUMENTS

EP    1 211 171    6/2002

(Continued)

OTHER PUBLICATIONS

International Search Report mailed May 13, 2008 for International Application No. PCT/JP2008/051389.

(Continued)

*Primary Examiner* — Lars A Olson
(74) *Attorney, Agent, or Firm* — Wenderoth, Lind & Ponack, L.L.P.

(57) ABSTRACT

A stern shape of a displacement-type marine vessel enables reduction of the hull resistance and prevents propeller cavitation. The displacement-type marine vessel which travels in a velocity range in which the Froude number is smaller than the last hump and the stern includes knuckle lines connecting knuckle points provided on the surface of the hull, from a starting point in front of a propeller to an end point behind the propeller. A portion of the stern located inside the knuckle line in the direction of the width of the hull has a dome shape with upward curvature, and the length of the portion which has the dome shape is set to 10% or more of the entire hull length or at least the diameter of the propeller.

19 Claims, 16 Drawing Sheets

U.S. PATENT DOCUMENTS

| | | |
|---|---|---|
| 4,363,630 A | 12/1982 | Di Vigano |
| 4,550,673 A * | 11/1985 | Ingvason .................... 114/61.28 |
| 4,843,989 A * | 7/1989 | Langenberg ................ 114/61.28 |
| 5,598,802 A * | 2/1997 | Ramde ........................ 114/61.28 |

FOREIGN PATENT DOCUMENTS

| | | |
|---|---|---|
| JP | 49-37386 | 4/1974 |
| JP | 51-2193 | 1/1976 |
| JP | 58-46694 | 3/1983 |
| JP | 59-28960 | 8/1984 |
| JP | 61-044090 | 3/1986 |
| JP | 61-50894 | 3/1986 |
| JP | 1-153396 | 6/1989 |
| JP | 06-344973 | 12/1994 |
| JP | 2716658 | 12/1994 |
| JP | 2002-154475 | 5/2002 |
| JP | 2005-186714 | 7/2005 |

OTHER PUBLICATIONS

Extended European Search Report issued Jun. 1, 2011 in corresponding European Patent Application No. 08704156.2.

\* cited by examiner

STERN SHAPE OF DISPLACEMENT-TYPE MARINE VESSEL

TECHNICAL FIELD

The present invention relates to a stern shape of a displacement-type marine vessel which travels in a velocity range yielding a Froude number (Fn) which is smaller than the last hump, such as a tanker, a container ship, or a ferry boat.

BACKGROUND ART

Conventionally, a displacement-type marine vessel whose hull partly travels in water is known to sometimes have a fin called a stern tunnel fin for inducing flow to a position above a propeller, which is mounted to extend from a position on the hull in front of the propeller to a position on the hull above the propeller. In the displacement-type marine vessel as such, since the stern tunnel fin accelerates and makes uniform the flow into the propeller and prevents propeller cavitation, vibration of the hull is restrained (For example, see Patent Citation 1)

A stern shape is proposed which maintains a certain distance between a propeller and a hull by bending the bottom of the stern above the propeller upward. With this stern shape, the vibration of the stern due to a vibratory force of the propeller is maintained to be an equivalent to that of a vessel having the stern shape of the related art, so that improvement of propulsive efficiency is possible by increasing the diameter of the propeller (For example, see Patent Citation 2).

Among planing high-velocity ships which travel with their hull raised to a level higher than a draft line and in the velocity range in which the Froude number is larger than the last hump, a vessel type called chine is known. The chine vessel type has a vessel bottom portion formed into a dome shape, and the vessel bottom portion and the side plates of the vessel join at an angle. (For example, see Patent Citation 3)

Patent Citation 1: Japanese Examined Utility Model Application, Publication No. 59-28960 (see FIG. 5)
Patent Citation 2: The Publication of Japanese Patent No. 2716658 (see FIG. 1 and FIG. 2)
Patent Citation 3: Japanese Unexamined Patent Application, Publication No. 61-044090

DISCLOSURE OF INVENTION

Upsizing or speeding up of displacement-type marine vessels has been demanded in recent years. Therefore, reduction of vibrations of the hull by reducing hull resistance and restraining the propeller cavitation is required.

However, although the stern tunnel fin described above has an effect of reducing the hull resistance by accelerating and rectifying the flow, the fin protruding from the hull becomes a resistance generating source. Therefore, the stern tunnel fin might not necessarily reduce overall resistance, because its hull resistance reduction effect might be contradicted by its being a resistance generating source. Therefore, if the stern tunnel fin is employed, there may have to be limitations on hull shape etc.

Furthermore, although the stern tunnel fin improves the acceleration and uniformity of the flow above the propeller when it is made larger, this also increases the resistance of the fin and hence significantly lowers the velocity, so that the fin size cannot be increased too much from a practical standpoint.

In view of such circumstances, it is an object of the present invention to provide a stern shape of a displacement-type marine vessel in which hull vibrations are reduced by reducing the hull resistance and restraining the propeller cavitation, so that it can travel in a velocity range where the Froude number is smaller than the last hump.

The last hump is the point where the Froude number Fn (Fn=vessel velocity/(vessel length×acceleration of gravity)$^{1/2}$) is near 0.4 to 0.5, indicating that the coefficient of resistance is at its highest value.

In order to solve the above described problem, the present invention employs the following means.

The present invention is a stern shape of a displacement-type marine vessel for travel in a velocity range where the Froude number is smaller than the last hump, which has a upward curve boundary formed by connecting starting points of outward curvature at cross-sections of the hull at the stern taken along the fore-and-aft direction of the hull starting at a point in front of a propeller and ending behind the propeller, in which a frame line located to the inside the upward curve boundary in the direction of the width of the hull is formed into a dome shape curving upward, the hull length which forms the dome shape being 10% or more of the entire length or at least as long as the diameter of the propeller, and the position of the starting point of the dome in the direction of the width of the hull is set to be outside the radius of the propeller.

With the stern shape of the displacement-type marine vessel being as described above, a upward curve boundary formed continuously by connecting the starting points of outward curvature from the cross-sections of the hull of the stern along the fore-and-aft direction of the hull from a starting point in front of the propeller to an end point behind the propeller is provided, a frame line located to the inside of the upward curve boundary in the direction of the width of the hull is formed into a dome shape curving upward, the hull length which forms the dome shape is 10% or more of the entire length or at least as long as the diameter of the propeller, and the position of the starting point of the upward curve boundary in the direction of the width of the hull is set to be outside the radius of the propeller. Therefore, the flow in the vicinity of the protrusion is directed toward the centerline of the hull and the flow to the inside of the upward curve boundary in the direction of the width of the hull is efficiently drawn to a portion of the stern located above the propeller.

By providing the end point of the upward curve boundary behind the propeller, the flow field in the propeller is improved by accelerating the flow above the propeller shaft. In order to improve the flow field in the propeller, it is necessary to set the end point of the upward curve boundary to at least the position of the propeller.

In the invention described above, the upward curve boundary is preferably continued to the end of the stern, whereby the flow at the stern end is accelerated and further reduction of the hull resistance is achieved. In other words, the closer the end point of the upward curve boundary to the stern end on the rear side of the position of the propeller, the more remarkable the reduction of the hull resistance.

In the invention described above, the frame line located outside the upward curve boundary in the direction of the width of the hull is preferably formed into a curved surface swelling outward and coming into smooth contact with ship's outer side plate, whereby an angular corner at which an eddy current is generated when a flow flowing to the vessel bottom from the side of the vessel hits it while the ship is traveling is eliminated.

In this case, the frame line located outside the upward curve boundary in the direction of the width of the hull preferably includes an area which forms a part of a curved surface having upward curvature in the vicinity of the upward curve boundary, whereby the shape of the protrusion there is further angulated, sharpened and clarified.

In the invention described above, the protrusion is a fillet portion formed in the frame line, and the fillet portion is preferably at the position having the highest curvature in the frame line which is a turning point where the curvature of the frame line changes from great convexity toward the outside portion of the frame line to great concavity toward the inside portion of the frame line, whereby the formation of the protrusion is facilitated. In this case, a protrusion from the fillet portion toward the outside the hull is preferably provided, whereby a sharp angular shape is easily formed.

In the invention described above, the upward curve boundary is preferably formed so as to gradually approach the centerline of the hull (shaft line) as it progresses to the rear of the hull, or in parallel to the centerline of the hull, whereby a flow intersecting the upward curve boundary is prevented.

In the invention described above, the upward curve boundary is preferably formed so as to gradually approach the centerline of the hull as it progresses to the rear of the hull from the starting point to the position of the propeller and so as to diverge from the centerline of the hull from the position of the propeller to the end point, whereby the flow on the rear half portion of the hull which first is parallel to the centerline of the hull but then is narrowed in the direction of the width is prevented from intersecting the upward curve boundary, the flow in the vicinity of the hull is induced toward the center portion of the hull and accelerate the flow to a position above the propeller, and the velocity of the flow toward the rear end of the stern is reduced to increase the pressure at the rear end of the stern.

In the invention described above, the dome shape preferably has increased upward curvature at the rear of the propeller, whereby the flow flowing toward the rear end of the stern is reduced to increase the pressure at the rear end of the stern.

In the invention described above, the position of the upward curve boundary in the direction of the width of the hull is preferably closer to the hull centerline at the downstream side of the direction of rotation of the propeller (starboard side when the direction of rotation of the propeller is clockwise when viewed from the rear of the hull) than on the upstream side (portside in the same case), whereby the tendency of the flow to turn toward the propeller is strengthened on the upstream side and weakened in the downstream side, creating an upward flowing tendency. Accordingly, the overall flow rotates opposite to the rotation of the propeller, so that improvement of the efficiency of the propeller is achieved.

In the invention described above, the cross-sectional area of the flow channel below the dome shape is preferably larger on the side of the centerline of the hull which is upstream of the flow created by rotation of the propeller than on the downstream side, whereby the tendency of the flow inward into the propeller is strengthened on the upstream side and weakened in the downstream side, and there is a tendency to flow upward. Accordingly, overall rotational flow opposite to the rotation of the propeller is achieved, so that improvement of the efficiency of the propeller is achieved.

In the invention described above, in the dome shape a descending portion is preferably provided in front of the position where the vessel bottom protrusion is mounted, whereby the velocity of the flow hitting on the vessel bottom protrusion is reduced, and the exposure of the vessel bottom protrusion from the hull is reduced.

In the invention described above, when a rudder is provided, the rudder is preferably installed right below the upward curve boundary, whereby exposure of the rudder from the hull is reduced.

In the invention described above, when a thruster is provided, the thruster is preferably installed right below the upward curve boundary, whereby exposure of the thruster from the hull is reduced. The thruster in this case includes an azimuth thruster and a POD.

In the invention described above, when a wedge member is provided at the stern end, the resistance reduction effect of the wedge member is improved.

As described above, with the stern shape of the displacement-type marine vessel of the present invention, reduction of the hull resistance is achieved by accelerating the flow from the position of the propeller to the vessel bottom portion of the stern, and the reduction of the hull vibration is achieved by restraining the propeller cavitation by uniformizing the flow flowing into the propeller.

Also, the amount of exposure of the vessel bottom protrusion from the hull is reduced by installing another vessel bottom protrusion such as the rudder or the thruster on the front portion of the original vessel bottom protrusion where the hull descends lower than the dome shape and the periphery of the vessel bottom protrusion or right below the upward curve boundary, reduction of increase in resistance while the ship is traveling due to the vessel bottom protrusion is achieved.

Since the stern shape of the present invention described above accelerates the flow of the vessel bottom portion of the stern, the resistance reduction effect of a wedge provided at the stern end is increased.

EXPLANATION OF REFERENCE NUMBERS

Figure 1:
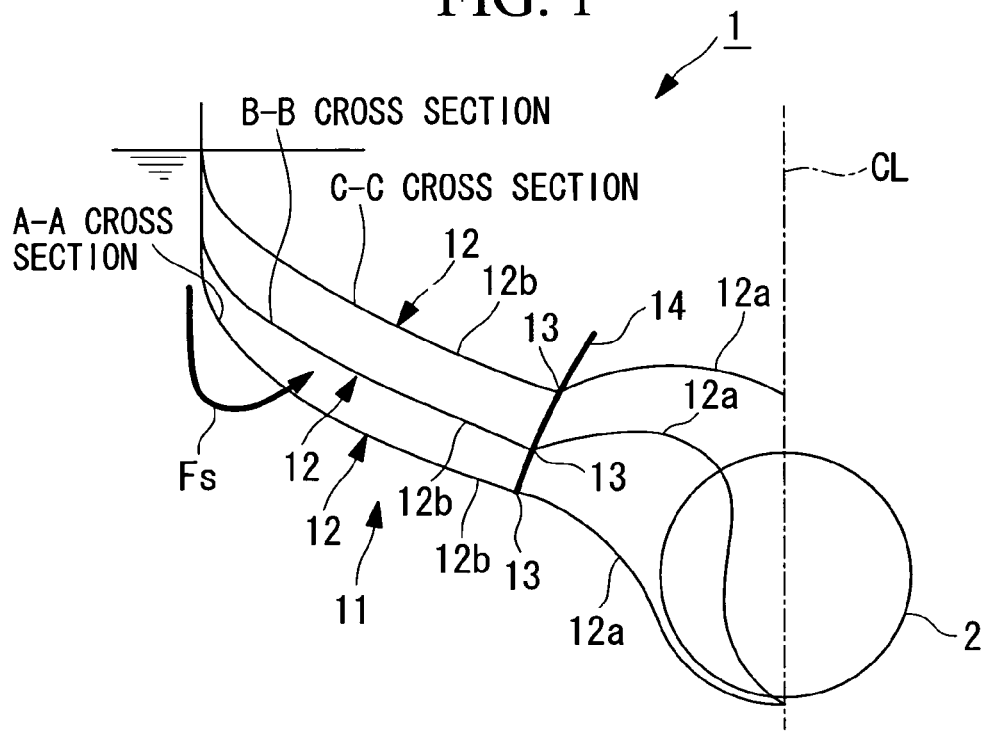
FIG. 1 is a cross-sectional view showing a stern shape of a displacement-type marine vessel, viewed from the stern side, which is the first embodiment of the present invention (cross sections taken along the lines A-A, B-B, and C-C in FIG. 2).

1: hull
2: rudder
3: propeller
11: stern side vessel bottom
12, 12A-C: frame line
12a: frame line (inner dome line)
12b: frame line (outer line)
12c: curved surface portion
12d: descended portion
13: knuckle point (protrusion)
14, 14', 14A, 14B, 14L, 14R: knuckle line (upward curve boundary)
20: fillet portion (protrusion)
21, 22: protruding portion
30: POD (thruster)
40: skeg
50, 60, 70: wedge member
S: starting point
E: end point

DETAILED DESCRIPTION OF THE INVENTION

Referring now to the drawings, an embodiment of a stern shape of a displacement-type marine vessel according to the present invention will be described.

First Embodiment

Figure 2:
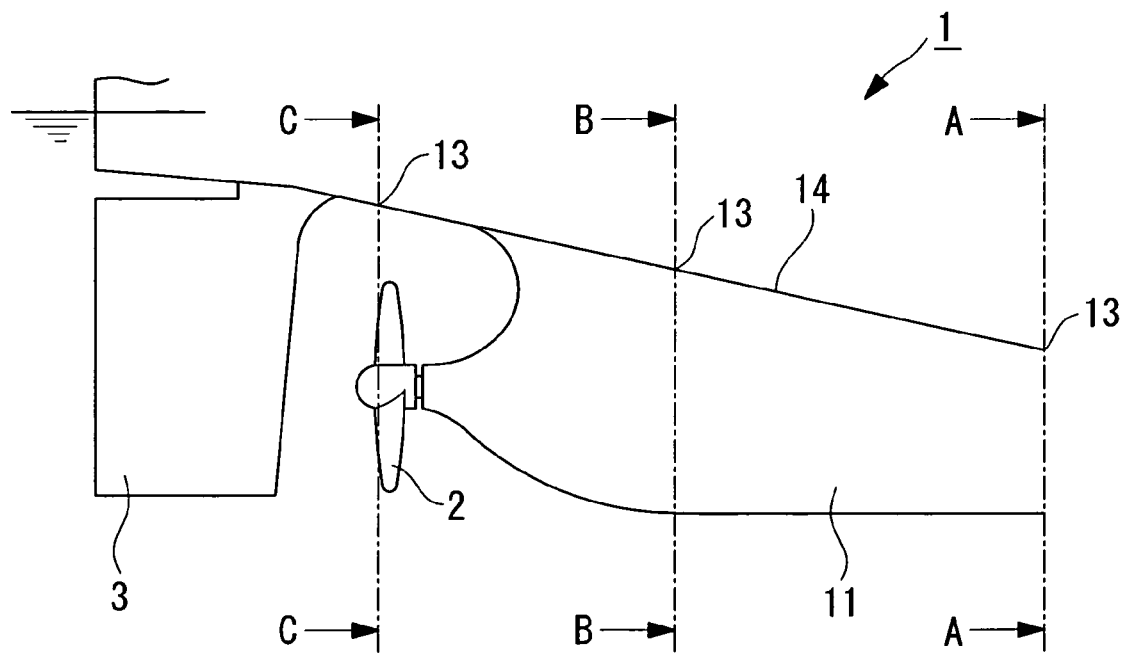
FIG. 2 is a side view showing the portion of a single-screw vessel bottom at the stern which exemplifies the stern shape of the displacement-type marine vessel according to the present invention.
Figure 3:
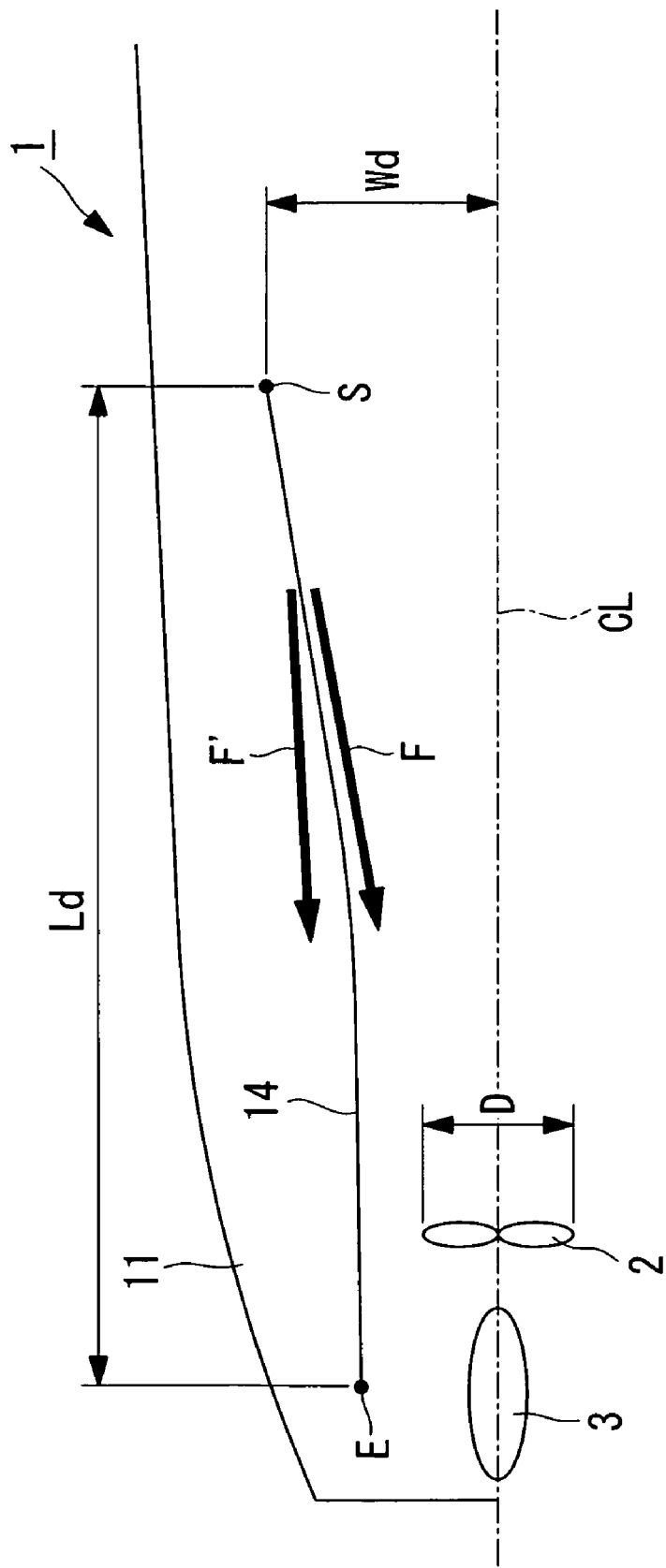
FIG. 3 is a bottom view of the portion of the vessel bottom at the stern, showing the stern shape of the displacement-type marine vessel shown in FIG. 1 and FIG. 2.

Referring now to FIG. 1 to FIG. 3, a first embodiment of the stern shape of the displacement-type marine vessel according to the present invention will be described.

FIG. 2 is a side view of the stern side bottom portion of the displacement-type marine vessel which travels in a velocity range where the Froude number is smaller than the last hump. The displacement-type marine vessel is a vessel a part of the lower portion of the hull of which is positioned under water and receives buoyancy, and a part of the hull travels under water. The displacement-type marine vessel shown in the drawings is a single-screw vessel, and the stern side bottom 11 of the hull 1 is provided on a hull centerline (shaft line) CL with a propeller 2 and a rudder 3, one each.

FIG. 1 is a stern shape drawing showing a view from the stern side of only the half of the hull 1 to the left of the hull centerline CL, the hull 1 having lateral symmetry. The A-A cross section, a B-B cross-section, and a C-C cross-section indicated in FIG. 2 are superimposed in this drawing. FIG. 3 is a bottom view of the stern side bottom 11 of the hull 1.

The stern shape shown in the drawing includes knuckle points (corner portions) 13 which are protrusions formed on a frame line 12 which defines the cross-sectional shape of the stern. By connecting these knuckle points 13, a knuckle line (upward curve boundary) 14 continuing in the fore-and-aft direction of the hull from a starting point S positioned in front of the propeller 2 to an end point E positioned behind the propeller 2 is formed on both sides of the stern side bottom 11.

A frame line 12a of the frame line 12 along the direction of the width of the hull, which corresponds to a portion inside the knuckle line 14 described above, that is, of the portion closer to the hull centerline CL than the knuckle line 14 (hereinafter, also referred to as "inner dome line") forms a dome shape having an upward curvature as shown in FIG. 1. On the other hand, frame line 12*b* which is located outside the knuckle line 14 along the direction of the width of the hull (hereinafter, also referred to as "outer line") has a curvature swelling downward and is connected to the side portion of the vessel. Therefore, the frame line 12 is changed from the outer line 12*b* having downward curvature into the inner dome line 12*a* having upward curvature with the knuckle line 14 as a boundary, and hence there is a dome shape having an upwardly curving surface between the knuckle lines 14. In other words, the frame line 12 is changed from the outer line 12*b* which forms the curved surface of the hull 1 swelling outward and extending from the side portion of the vessel, into the inner dome line 12*a* forming the curved surface curving inwardly toward the center of the hull 1, with the knuckle line 14 as the boundary.

The length Ld of the hull portion formed in the above-described dome shape (see FIG. 3) is set to be 10% or more (Ld≧0.1L) of the entire length L of the hull 1, or to be at least as long as the diameter D of the propeller 2 (Ld≧D). In other words, the dome shape starts as far toward the front of the hull 1 and continues to as far behind the propeller 2 as possible. The hull portion length Ld in this case is the length in the direction of the hull length of the range in which the dome shape is formed on the hull centerline CL as seen in a plain view of the hull 1. In other words, preferably, the hull portion length Ld in this case is the length from the starting point S to the end point E of the knuckle line 14, measured along the hull centerline CL as seen in a plain view of the hull 1. The preferable hull portion length Ld is 20% or more of the entire length L of the hull 1 (Ld≧0.2L), and the position of the largest lateral cross section of the hull 1 is the front position when defining the upper limit of the hull portion length Ld.

The starting point S of the knuckle line 14 is set to be to the outside of the position of the radius of the propeller 2 in the direction of the width of the hull 1. In other words, the hull widthwise distance Wd from the hull centerline CL to the starting point S is set to be a value larger than the radius (D/2) of the propeller 2 (Wd>D/2).

The knuckle point 13 described above is a protrusion formed by press-molding a plate to be the stern side vessel bottom 11 or by joining plates, and, in order to increase the flow inducing action described later, it is preferable to form the knuckle point 13 into an edge shape which is as sharp (angular) as possible. However, in actual manufacture or the molding process, the distal end of the knuckle point 13 might assume a Rounded shape or a welding line depending on various conditions such as the method of machining or the panel thickness. Therefore, in the present invention, the knuckle point 13 having a Rounded shape or a welding line at its distal end is also acceptable.

The effects and advantages of the stern shape of the displacement-type marine vessel described above will be described below.

As described above, according to the stern shape formed by forming the knuckle line 14 and forming the frame line 12*a* between the knuckle lines into the dome shape, the water flow while the ship is traveling is such that the flow in the vicinity of the knuckle point 13 is induced in the direction of the hull centerline CL as indicated by an arrow F in FIG. 3. Therefore, the flow between left and right knuckle lines 14 is efficiently drawn toward the portion of the stern above the propeller 2. At this time, by increasing the width between the knuckle lines 14 toward the starting point S and positioning the starting point S as far forward on the hull 1 as possible, induction and inward drawing of the flow are effectively achieved.

The arrow indicated by F' in the drawing shows a water flow when the knuckle line 14 is not present, and extends substantially parallel to the hull centerline CL.

In this manner, when the flow inside the knuckle lines 14 is drawn efficiently toward the upper portion of the stern above the propeller 2, the flow is accelerated at the upper portion of the stern above the propeller 2, so that the hull resistance is reduced. Also, since the flow flowing in to the propeller 2 is made to be uniform, the propeller cavitation is restrained, and the hull vibrations are reduced. In order to prevent the propeller cavitation, it is necessary to position the end point E to the stern side of the propeller 2, if even slightly.

In addition, unlike the stern tunnel fin described in conjunction with the related art, since the stern shape described above does not have a large protrusion protruding from the hull 1, resistance is not generated by the protrusion. Therefore, when increase of the effect to reduce the hull resistance or the hull vibrations is desired, this is achieved by increasing the width between the knuckle lines 14, so that increase in the resistance when the hull resistance reduction effect is strengthened as with the stern tunnel fin is avoided.

In other words, by adjusting the position of the knuckle point 13 along the direction of width of the hull 1 in the stern shape of the present invention, thus changing the width of the portion having the dome shape, the degree of improvement of the flowing field can be adjusted so that the same effect of improvement of the flowing field as changing the size of the stern tunnel fin is achieved without involving the generation or change of resistance due to the protrusion.

In the embodiment described above, the end point E of the knuckle line 14 is positioned behind the propeller 2. However, in order to further reduce the hull resistance, the knuckle line 14 is preferably extended so as to continue to the end of the stern, the rearmost point of the vessel bottom 11. In other words, the end point E of the knuckle line 14 is preferably positioned at the stern end.

Figure 4:
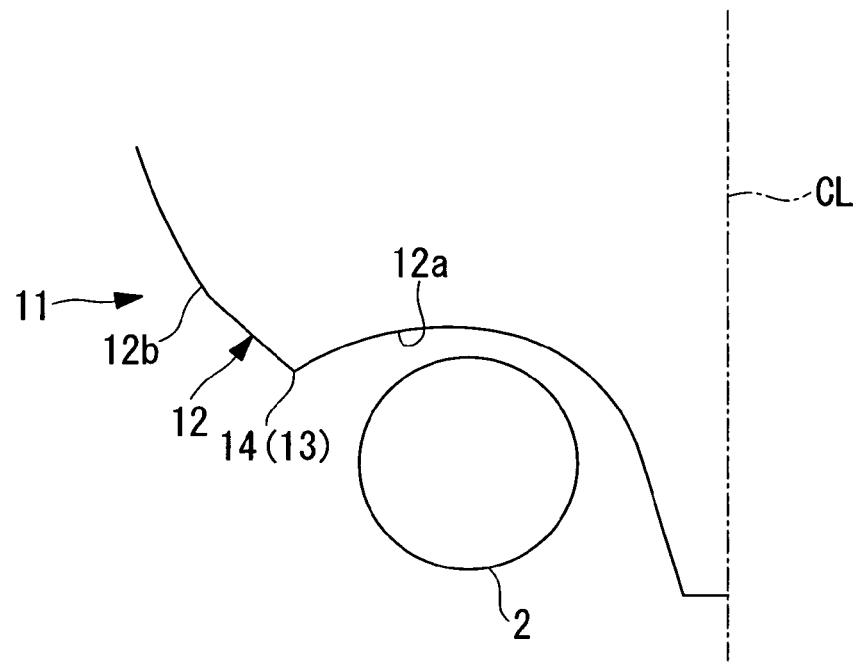
FIG. 4 is a drawing showing the stern shape when the first embodiment of the present invention is applied to a twin-screw vessel.

In the embodiment described above, an example of application to the single-screw vessel as the displacement-type marine vessel has been described. However, the present invention is not limited thereto, and may also be applied to a twin-screw vessel having a pair of left and right propellers 2, for example, as shown in FIG. 4.

In the embodiment described above, the outer line 12*b* which is located outside the knuckle lines 14 in the direction of the width of the hull has a curvature swelling downward from the side portion of the vessel. However, the outer line 12*b* is preferably formed into a curved surface which has a curvature swelling outward and smoothly joining with the side plate which is substantially vertical as shown in FIG. 1. In this manner, when the outside of the outer line 12*b* in the direction of the width of the hull is formed into the curved surface which smoothly joins with the side shell, there is no angular portion which generates an eddy current when the flow flowing from the side portion of the vessel to the vessel bottom portion while the ship is traveling (see an arrow Fs shown in FIG. 1) hits it, which is effective for reducing the resistance during travel.

Figure 5:
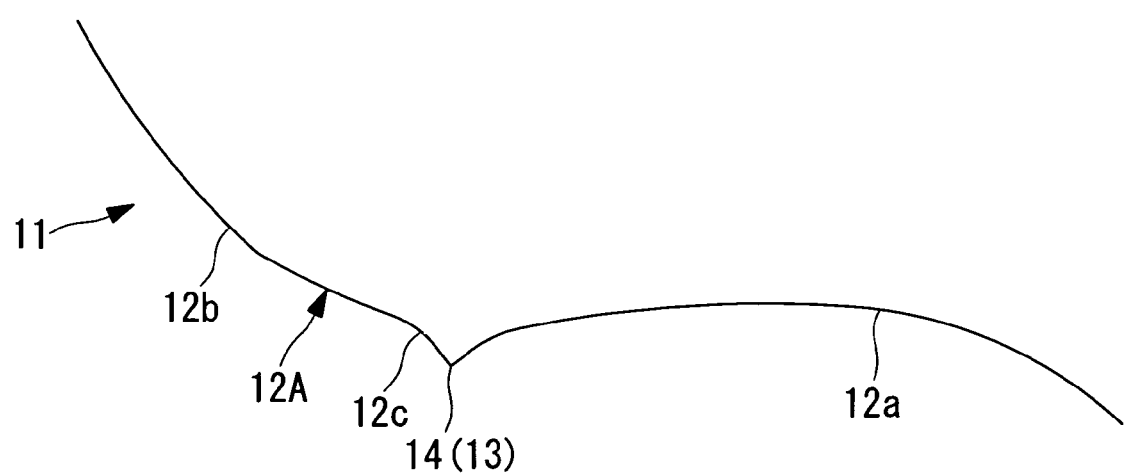
FIG. 5 is a drawing showing a first modification of the stern shape in the first embodiment shown in FIG. 1.

In a frame line 12A in a first modification shown in FIG. 5, the frame line portion 12*b* located outside the knuckle line 14 along the direction of width of the hull is provided with a curved surface portion 12*c* in the vicinity of the knuckle point 13 which extends outward toward the knuckle point. When the frame line 12A having the curved surface portion 12*c* is employed, a knuckle point 13 which is more angular and clear is easily formed. In other words, by forming the both sides of the knuckle point 13 into curved surfaces extending outward toward the knuckle point, the knuckle point 13 is easily made sharp with a smaller angle, which is effective for improving the flow inducting action.

Second Embodiment

Referring now to FIG. 6A, FIG. 6B, FIG. 7A, and FIG. 7B, a second embodiment of the stern shape of the displacement-type marine vessel according to the present invention will be described. The same components as in the embodiment described above are designated by the same reference numerals, and detailed description thereof will be omitted.

Figure 6A:
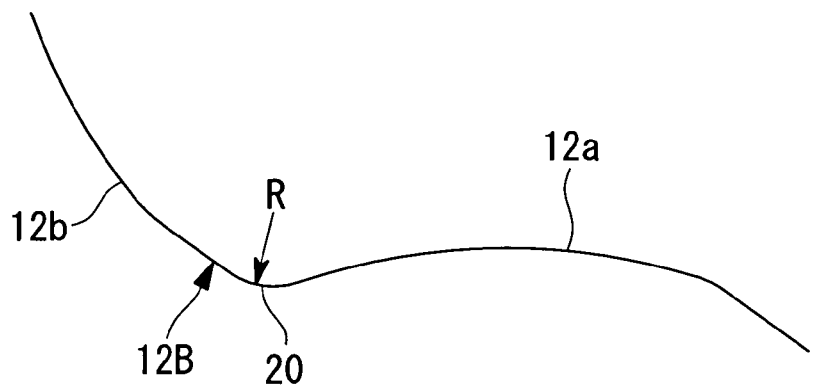
FIG. 6A is a drawing showing the stern shape of the displacement-type marine vessel of a second embodiment of the present invention.

In this embodiment, the protrusion provided on the cross-sectional shape of the stern is, for example, a rounded fillet portion 20 formed at an intermediate position of a frame line 12B as shown in FIG. 6A. Therefore, the upward curve boundary in this embodiment is a rounded fillet line formed continuously by connecting the fillet portions 20 along the fore-and-aft direction of the hull.

Figure 6B:
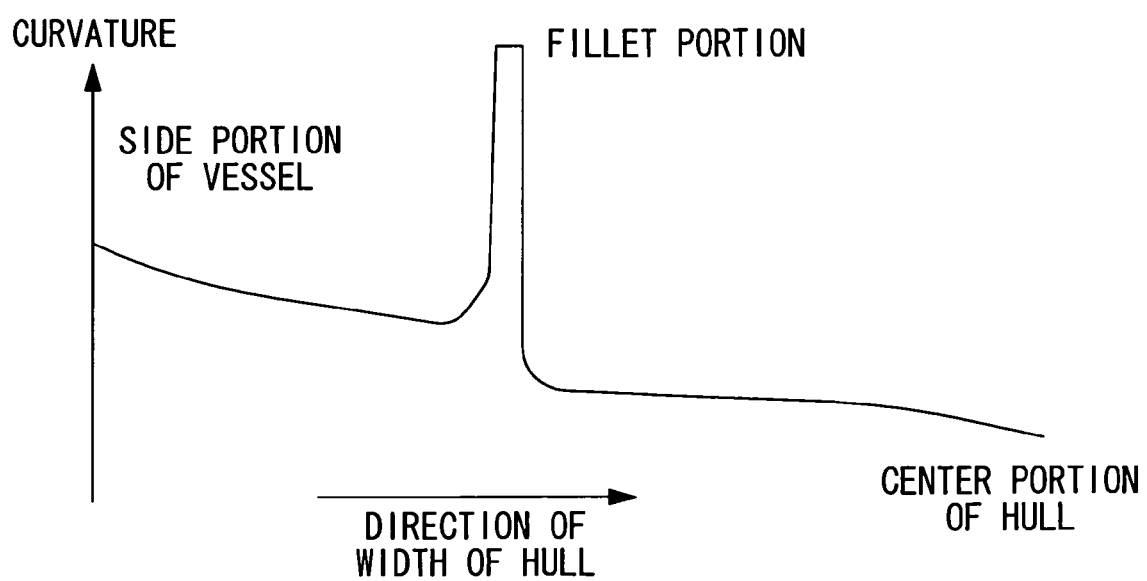
FIG. 6B is a drawing showing a curvature change along the direction of the width of the hull in the stern shape shown in FIG. 6A.

The edge of the fillet portion 20 described above has an arcuate shape and has the smallest angular rounded shape possible according to the manufacture requirements thereof. The fillet portion 20 will be described in detail. For example, as shown in FIG. 6B, the curvature of the frame line 12B suddenly becomes much greater than that of the portion of the frame line toward the side portion of the vessel along the direction of the width of the hull and suddenly decreases again at the inner portion of the frame line toward the center of the vessel along the direction of the width of the hull. In other words, the fillet portion 20 is a connecting point between the portion swelling outward and the inner dome line 12a having inward curvature, located midway along the frame line 12B, and is the maximum curvature position where the curvature is maximum. The fillet portion 20 may be a separate part attached to the hull 1.

In this case, the fillet portions 20 which form a fillet line preferably have arcs with uniform curvature for the sake of easy definition of the shape in design (CAD). In addition, when the radii of the arcs of the fillet portions 20 are set to be uniform over the entire length of the fillet line, still easier definition of the shape in design is achieved.

The positive and negative (large and small) of the curvature is defined in such a manner that the outwardly swelling surface of the hull 1 is positive (large) and the inwardly curving surface is negative (small).

By the employment of the fillet portions 20 as such, even when the formation of the protrusion by the knuckle point 13 on the hull shape is difficult for industrial art or construction method, effects and advantages similar to the first embodiment described above are achieved. In other words, forming the protrusion on the stern side vessel bottom 11 of the hull 1 is facilitated by forming fillet portions 20 having a small radius of curvature.

Also, the fillet portion 20 in the arcuate shape is preferably formed to be closer to a sharp angular shape at an acute angle by increasing the curvature (decreasing the radius of curvature) of the frame line 12B in order to increase the flow inducing action. Therefore, the radius of curvature of the fillet portion 20 is preferably set to as small a value as possible, not more than 500 mm.

The fillet portion 20 described above is formed into an arcuate shape. However, it is also possible to employ modifications shown in FIG. 7A and FIG. 7B, for example.

Figure 7A:
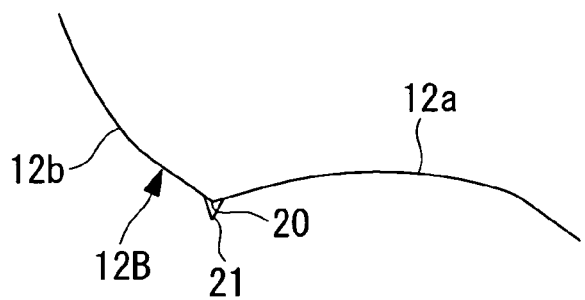
FIG. 7A is a drawing showing a first modification of a fillet portion according to the second embodiment shown in FIG. 6A.
Figure 7B:
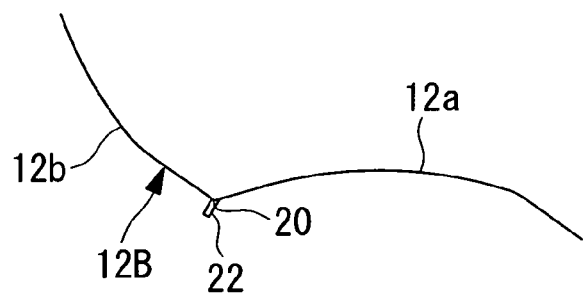
FIG. 7B is a drawing showing a second modification of the fillet portion according to the second embodiment shown in FIG. 6A.

In a first modification shown in FIG. 7A, a protruding portion 21 having a triangular shape in cross section protruding from the arcuate shaped fillet portion 20 away from the hull is provided. In a second modification shown in FIG. 7B, a protruding portion 22 of a flat-plate shape protruding away from the hull and from the arcuate shaped fillet portion 20 is provided.

Such protruding portions 21, 22 are separate components attached to the stern side bottom 11 of the hull 1, whereby a sharp protrusion closer in shape to the above-described knuckle point 13 is easily formed to improve the flow inducing action.

Third Embodiment

Referring now to FIG. 3 to FIG. 8, a third embodiment of the stern shape of the displacement-type marine vessel according to the present invention will be described. The same components as in the embodiment described above are designated by the same reference numerals, and detailed description thereof will be omitted.

In this embodiment, as shown in FIG. 3 for example, the knuckle line (upward curve boundary) 14 is formed so as to come gradually closer to the hull centerline CL toward the rear of the hull 1 so that the rear (the stern side) of the hull becomes narrow or extends in parallel to the hull centerline CL.

The knuckle line 14 preferably does not intersect significantly with the flow in the vicinity of the hull in order to have effective flow inducting action and to reduce the hull resistance. The flow in the rear half portion of the hull has angles such that the flow changes from flowing parallel to the hull centerline CL to narrowing toward the rear, and hence similar inclination is provided in the knuckle line 14.

Figure 8:
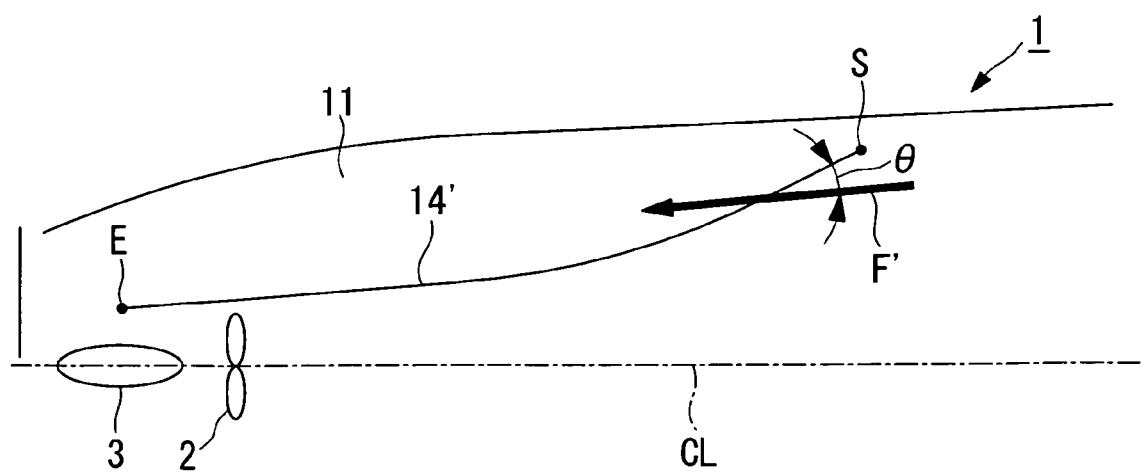
FIG. 8 is a bottom view of the portion of the vessel bottom at the stern showing the displacement-type marine vessel of a third embodiment of the present invention.

However, for example, when the angle of inclination θ of knuckle line 14' with a water flow F' is too steep and large as shown in FIG. 8, the flow at the knuckle point 13 intersects the knuckle line 14'. Therefore, it may result not only in insufficient inductive action for inducing the flow to the center portion of the hull, but also increase in hull resistance due to generation of an eddy current at the knuckle point 13.

Therefore, if the flow line in the vicinity of the hull can be determined by CFD calculation or experiments with models or the like, the shape of the knuckle line 14 may be defined so as to match the flow line. In this case, in order to achieve a preferable inductive action, the shape of the knuckle line 14 is preferably determined so that the angle with respect to the flow line stays below 5°.

As a result, the knuckle line 14 is able to induce the flow to the vicinity of the propeller 2 efficiently, and to reduce the resistance caused by eddy current generated at the knuckle line 14.

Fourth Embodiment

Figure 9:
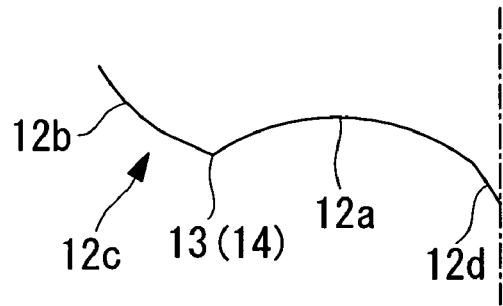
FIG. 9 is a drawing showing the stern shape of the displacement-type marine vessel a fourth embodiment of the present invention.
Figure 10A:
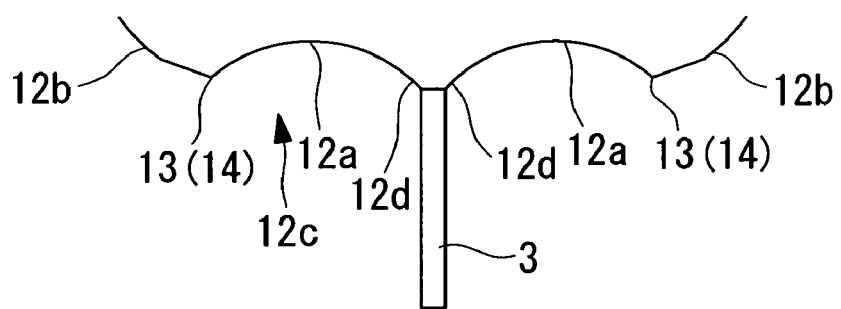
FIG. 10A is a drawing of a vessel bottom protrusion attached to the stern shape in FIG. 9 showing a state in which a rudder is mounted.
Figure 10B:
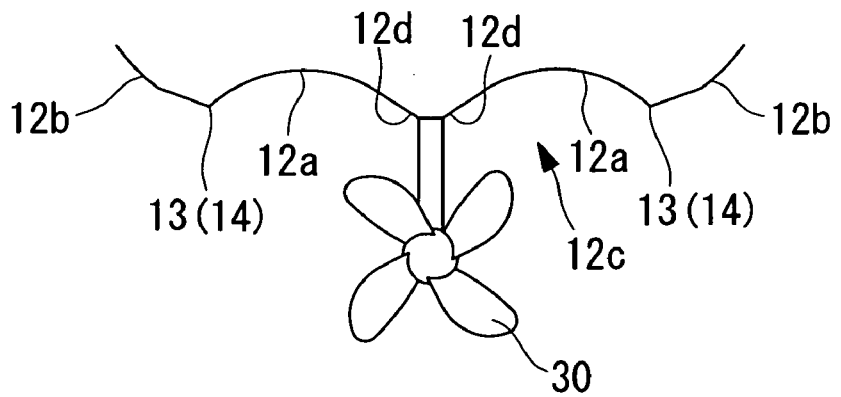
FIG. 10B is a drawing showing the vessel bottom protrusion attached to the stern shape in FIG. 9 showing a state in which a POD is mounted.
Figure 11:
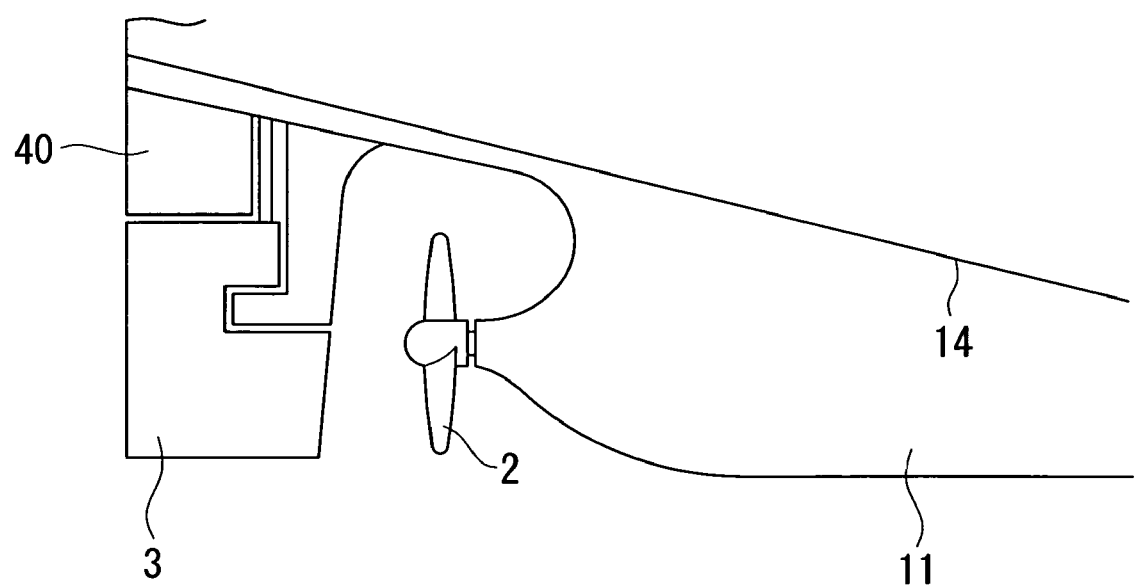
FIG. 11 is a side view showing a stern side vessel bottom portion which is an example of the fourth embodiment of the present invention applied to a skeg.

Referring now to FIGS. 9 to 11, a fourth embodiment of the stern shape of the displacement-type marine vessel according to the present invention will be described. The same components as in the embodiment described above are designated by the same reference numerals, and detailed description thereof will be omitted.

In this embodiment, a descended portion located in front of where the vessel bottom protrusion is attached (hereinafter, referred to as "descended portion") is provided instead of the dome shape described above. This descended portion 12d reduces the velocity of the flow which hits on the vessel bottom protrusion and reduces the exposure of the vessel bottom protrusion from the hull. The vessel bottom protrusion in this case may be a POD 30 or a skeg 40 as well as a rudder 3.

The descended portion 12d shown in FIG. 9 is provided in the case where the vessel bottom protrusion is installed at the center portion of the hull, and the stern shape in which the vessel bottom shape from a position in front of the vessel bottom projection to the position of the vessel bottom projection is risen upward once on the inner side of the knuckle point 13 to form the dome shape and, from the upper most point, is declined toward the hull centerline CL is provided.

With such a stern shape, since the flow is accelerated from the vicinity of the propeller 2 to the rear end of the vessel bottom, the flow which hits on a vessel bottom protrusion such as the rudder 3 is also accelerated. Therefore, a flow which is faster than normal hits on the vessel bottom protrusion, e.g. the rudder 3, and hence the resistance of the vessel bottom protrusion is increased.

Therefore, in a normal single-screw single-rudder vessel as shown in FIG. 10A, when the rudder 3 is installed at the center of the hull, a hull shape having a descended portion 12d which descends from the hull centerline CL as shown in FIG. 9 from the area between a position in front of the rudder 3 and the rudder is provided. Consequently, the velocity of the flow hitting on the rudder 3 is reduced by the presence of the descended portion 12d and the exposed portion of the rudder 3 from the hull 1 is also reduced, so that the resistance of the rudder 3 while the ship is traveling is reduced.

The descended portion 12d described above also provides the same effects and advantages in the case where a thruster of a type suspended from the hull 1 and supported thereby is installed at the center portion of the hull as in the case of the POD 30 or the like shown in FIG. 10B for example.

Furthermore, the descended portion 12d described above achieves the same effects and advantages also when the skeg 40 shown in FIG. 11 for example is provided.

Fifth Embodiment

Referring now to FIG. 12A to FIG. 14B, a fifth embodiment of the stern shape of the displacement-type marine vessel according to the present invention will be described. The same components as in the embodiment described above are designated by the same reference numerals, and detailed description thereof will be omitted.

Figure 12A:
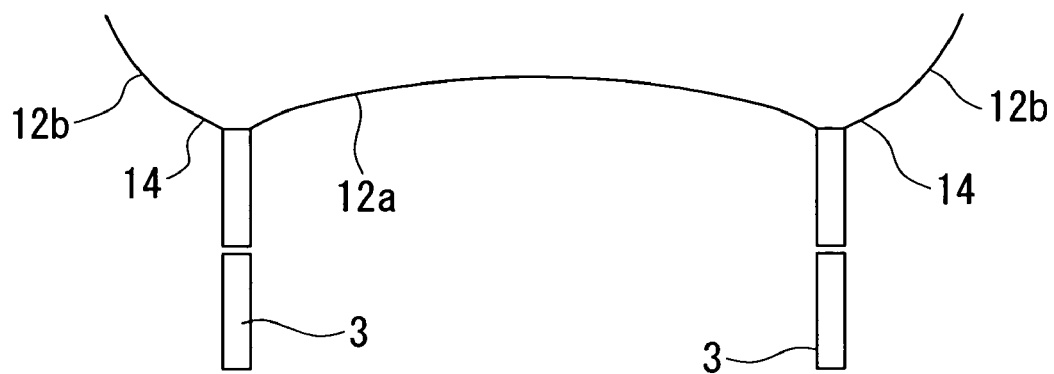
FIG. 12A is a drawing showing the stern shape of the displacement-type marine vessel when a fifth embodiment of the present invention is applied to a twin-rudder vessel (cross section taken along the line G-G in FIG. 12B).
Figure 12B:
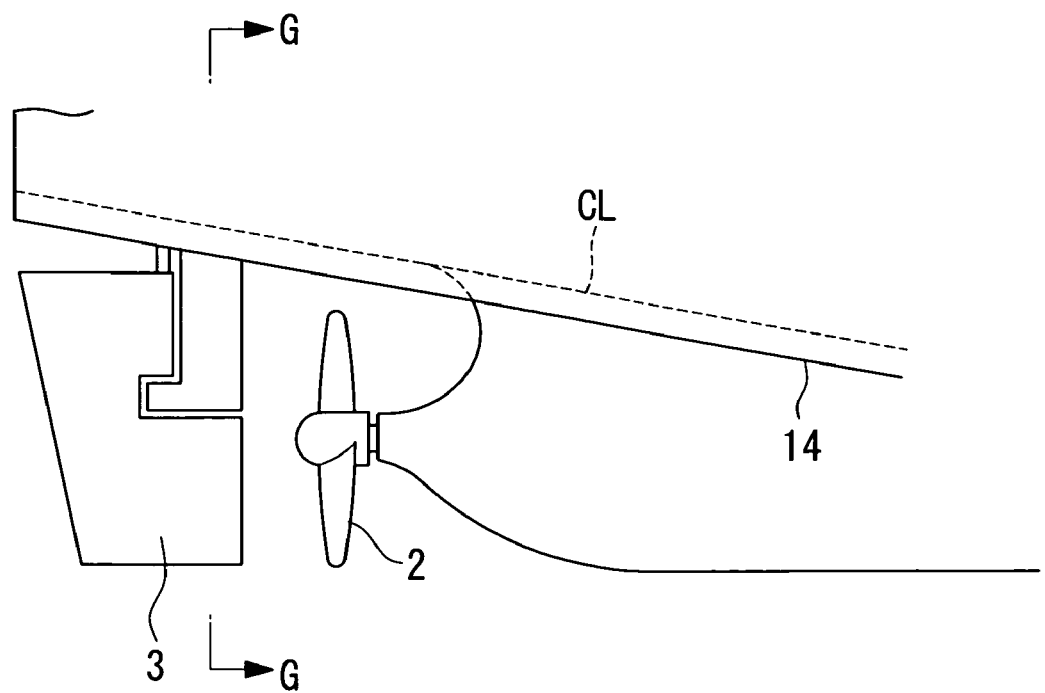
FIG. 12B is a side view of FIG. 12A.

In the embodiment shown in FIG. 12A and FIG. 12B, an example of configuration in which two of the rudders 3 are installed right below the knuckle lines 14. In other words, in the vessel having the two rudders 3, it is preferable to form the two knuckles lines 14 and install two rudders 3, each right below each knuckle line 14. In the case of a vessel where more than two rudders 3 are provided, a configuration is preferable in which the same number of knuckle lines 14 are formed as the number of rudders 3, and each of the rudders is provided right below one of the knuckle lines 14.

In this configuration, since the proportion of the rudder 3 exposed from the hull 1 is reduced as in the case of the fourth embodiment described above, the resistance of the rudder 3 generated while the ship is traveling is reduced.

In an embodiment shown in FIG. 13A and FIG. 13B, an example of configuration is shown in which thrusters such as the POD 30 or an azimuth thruster and the knuckle line 14 are provided and each of two thrusters is provided right below each knuckle line 14. In other words, in the vessel in which the POD 30 and the knuckle line 14 are provided, a configuration in which the POD 30 is provided right below the knuckle line 14 is preferable. In a vessel provided with more than two thrusters such as PODs 30, a configuration in which the same number of knuckle lines 14 are formed as the number of thrusters, and each of the PODs 30 is installed right below one of the knuckle lines 14 is preferable.

In this configuration, since the proportion of the thruster such as the POD 30 exposed from the hull 1 is reduced as in the case of the fourth embodiment described above, the resistance of the thruster generated while the ship is traveling is reduced.

Figure 13A:
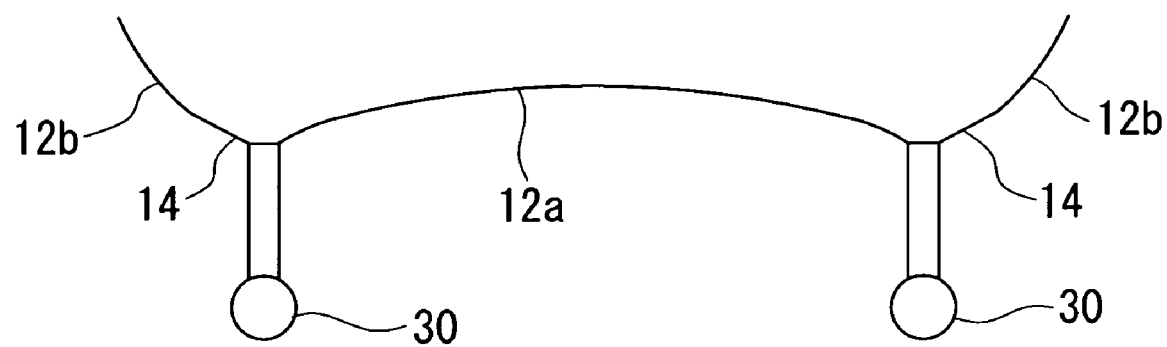
FIG. 13A is a drawing showing the stern shape of the displacement-type marine vessel when the fifth embodiment of the present invention is applied to a vessel having two PODs (cross section taken along the line H-H in FIG. 13B).
Figure 13B:
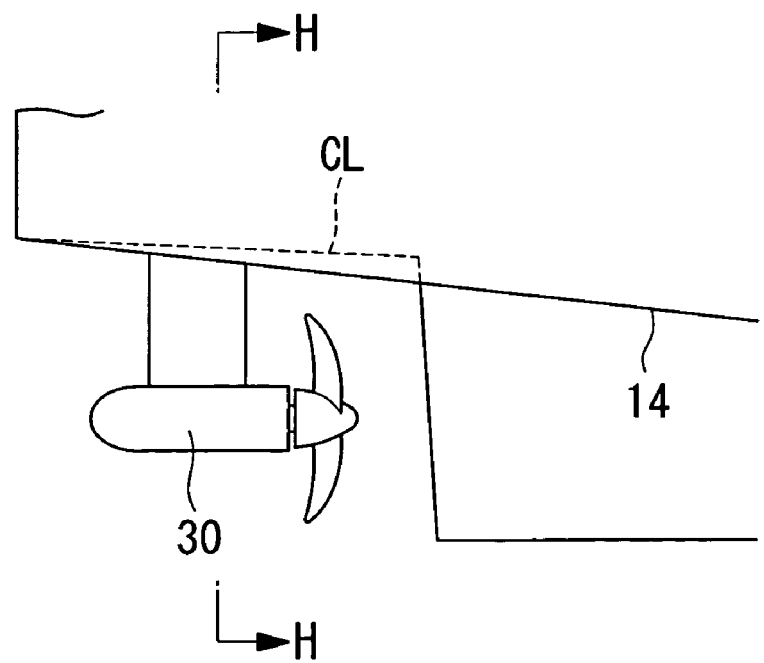
FIG. 13B is a side view of FIG. 13A.
Figure 14A:
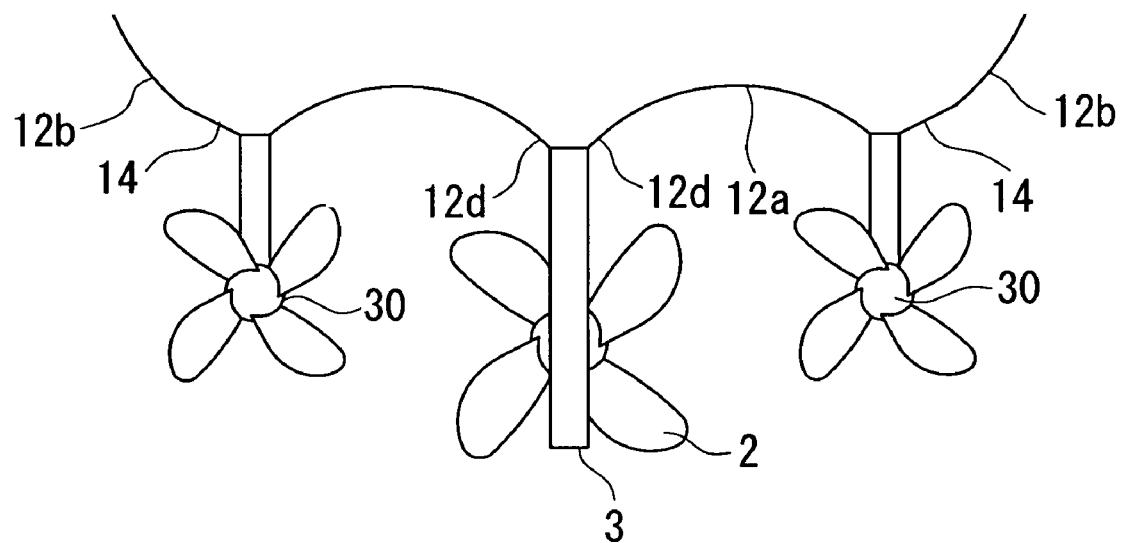
FIG. 14A is a drawing showing the stern shape of the displacement-type marine vessel when the fifth embodiment of the present invention is applied to a vessel having a pair of propellers, a rudder, and two PODs.
Figure 14B:
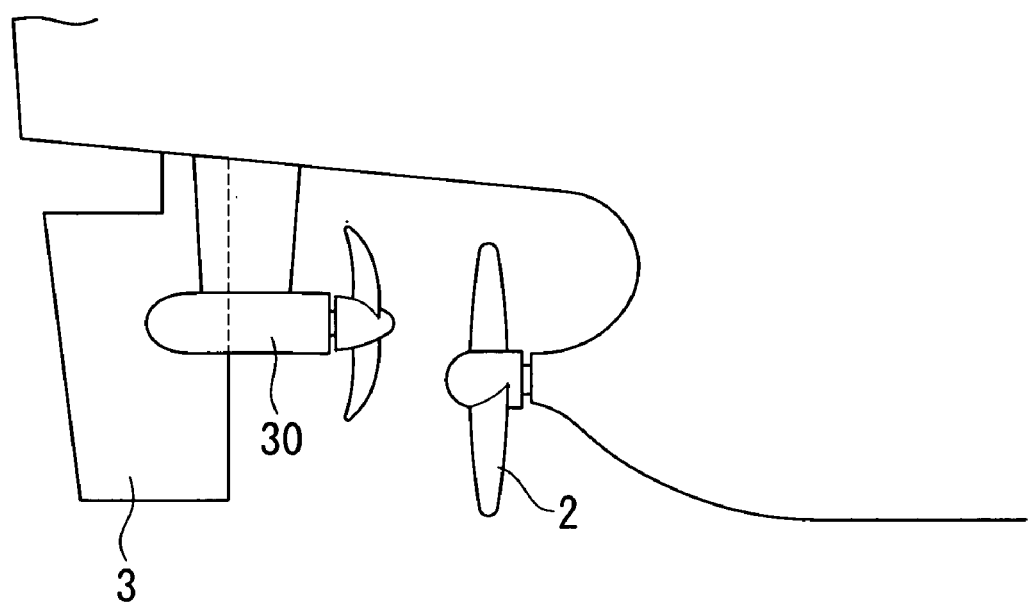
FIG. 14B is a side view of FIG. 14A.

The embodiment shown in FIG. 14A and FIG. 14B is a combination of the configuration shown in FIG. 10A and the configuration shown in FIG. 13A and FIG. 13B described above. In other words, the hull shape provided with the descended portion 12d at the area between a position in front of the rudder 3 installed at the center of the hull and the rudder is employed, and a configuration in which each of the PODS 30 is provided right below a knuckle line 14 is combined.

In this configuration, the velocity of the flow hitting on the rudder 3 is reduced by the presence of the descended portion 12d, and the portion of the rudder 3 or the POD 30 exposed from the hull 1 is also reduced. Therefore, the resistance of the rudder or the thruster generated while the ship is traveling is reduced.

Sixth Embodiment

Referring now to FIG. 15A to FIG. 16C, a sixth embodiment of the stern shape of the displacement-type marine vessel according to the present invention will be described. The same components as in the embodiment described above are designated by the same reference numerals, and detailed description thereof will be omitted.

Figure 15A:
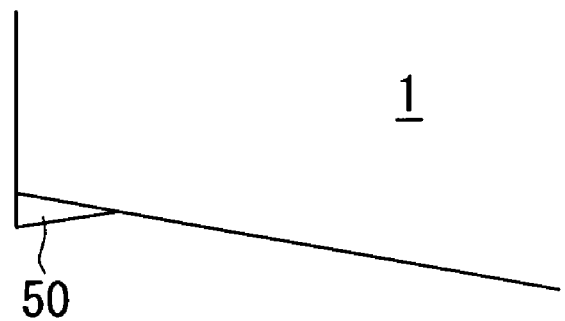
FIG. 15A is a drawing showing a wedge member according to a sixth embodiment of the present invention which is provided on the vessel bottom surface in the vicinity of the stern end.
Figure 15B:
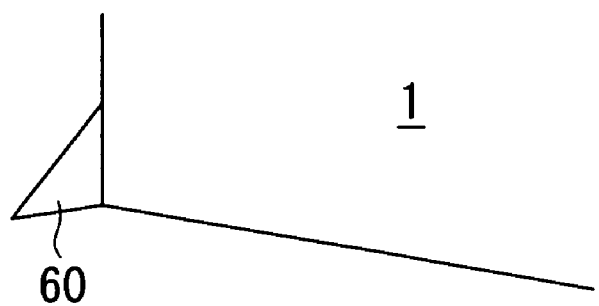
FIG. 15B is a drawing showing the wedge member according to the sixth embodiment of the present invention which is provided so as to protrude from the rear portion of the stern end.

In this embodiment, a wedge member is provided at the stern end of the hull in addition to the stern shape in the embodiment described above. This wedge member provides an inclined surface declining downward locally toward the rear away from the vessel bottom surface in the vicinity of the stern end from the rear of the stern end, for example, as shown in FIG. 15A and FIG. 15B. The wedge member 50 shown in FIG. 15A forms the vessel bottom surface in the vicinity of the stern end into an inclined surface declining downward locally toward the rear, and the wedge member 60 shown in FIG. 15B is an additional member (separate member) attached to the stern end with an inclined surface protruding from the rear of the stern end and providing a bottom surface declining downward toward the rear.

The wedge members 50, 60 described above embody known technology to reduce the hull resistance. Therefore, when the wedge members 50, 60 are incorporated in the stern shapes in the respective embodiments described above, the effect of accelerating the flow at the stern end to the rear of the propeller 2 is obtained in the case of the stern shape having a dome shape, so that the resistance reduction effect of the wedge members 50, 60 provided at the stern end is much enhanced by an increase of flow velocity.

Figure 16A:
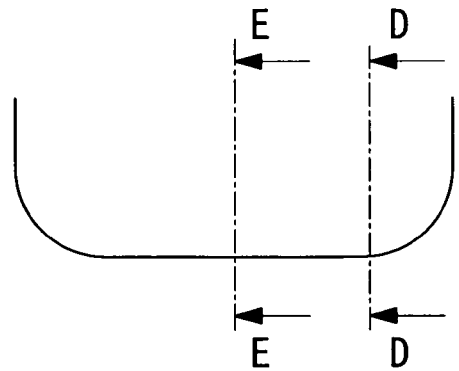
FIG. 16A is a drawing showing the wedge member according to the sixth embodiment of the present invention illustrating the shape of the stern end.
Figure 16B:
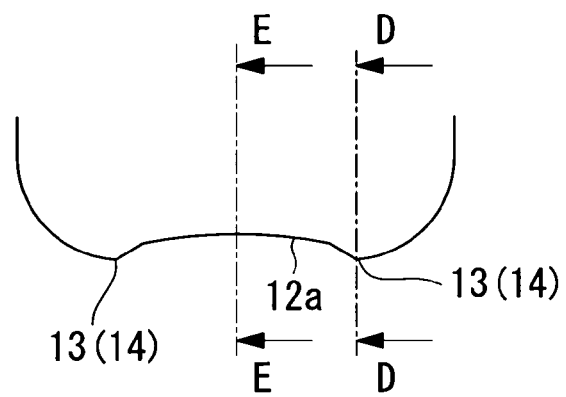
FIG. 16B is a drawing showing the wedge member according to the sixth embodiment of the present invention illustrating a lateral cross section (cross section taken along the line F-F in FIG. 16C) of the vessel bottom shape.
Figure 16C:
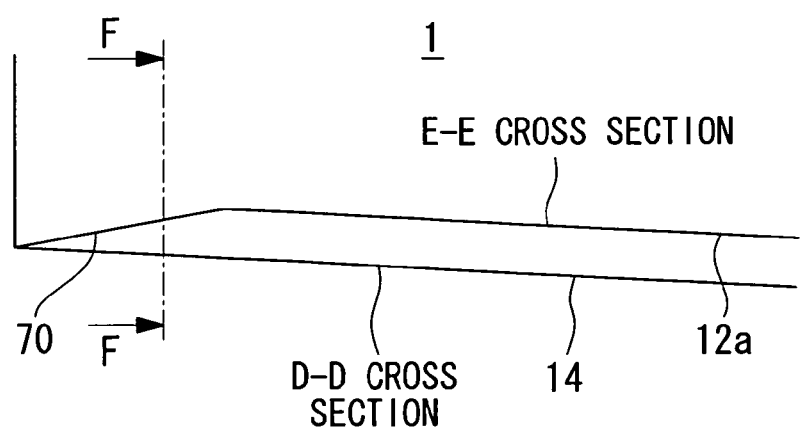
FIG. 16C is a drawing showing the wedge member according to the sixth embodiment of the present invention indicating the line D-D and the line E-E where the cross sections in FIG. 16A and FIG. 16B were taken.

A wedge member 70 shown in FIG. 16C is formed into a wedge shape by providing, on the bottom surface of the hull 1 having the knuckle lines 14 continuing to the stern end and a vessel cross section formed into a recessed dome-shaped curved surface continuing to the stern end, an inclination between the knuckle points 13, 13 in the vicinity of the stern end which descends toward the rear. The amount of decline of the wedge member 70 toward the rear in this case is adjusted by changing the shape of the surface along the direction of the width, so that the stern end is a horizontal line where the vessel bottom surface is the same height between the knuckle points 13, 13 as shown in FIG. 16A.

With this configuration as well, the resistance reduction effect of the wedge member 70 becomes even more remarkable. In addition, since the discontinuity between the wedge member 70 and the portions to the side is eliminated at the stern end, increase in resistance due to wave formation or wave breakage occurring due to discontinuity between the wedge member 70 and the hull 1 is also prevented, whereby the resistance reduction effect by the wedge member 70 is further increased.

Seventh Embodiment

Figure 17:
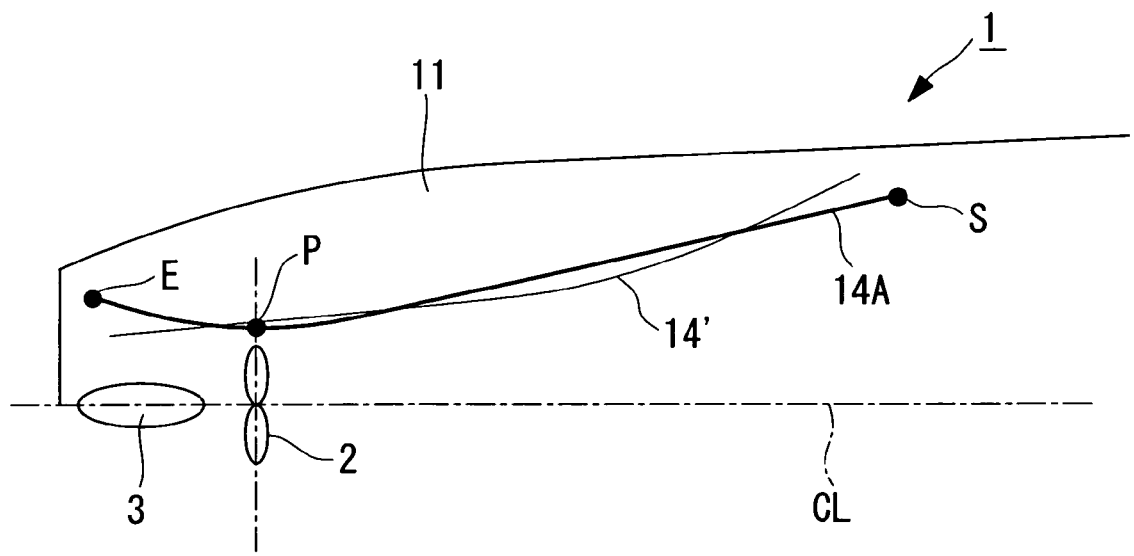
FIG. 17 is a bottom view of the stern side vessel bottom portion showing the stern shape of the displacement-type marine vessel according to a seventh embodiment of the present invention.

Referring now to FIG. 17, a seventh embodiment of the stern shape of the displacement-type marine vessel according to the present invention will be described. The same components as in the embodiment described above are designated by the same reference numerals and detailed description thereof will be omitted.

In this embodiment, a knuckle line 14A shown by a thick line in the drawing is formed to gradually approach the hull centerline CL toward the rear of the hull from the starting point S to the propeller position P and moves away from the hull centerline CL from the propeller position P toward the end point E. The propeller position P in this case is the position where the propeller 2 is attached along the direction of the vessel length. The thin solid line shown in the drawing is a comparative example for reference representing the knuckle line 14' of the third embodiment shown in FIG. 8.

In other words, since the knuckle lines 14A in this case approach toward the hull centerline CL as they go rearward from the front of the hull toward the propeller 2, the width between the left and right lines is narrowed toward the rear of the hull. Furthermore, since the knuckle lines 14A in this case move away from the hull centerline CL as they go from the propeller 2 toward the rear end of the stern, the width between the left and right lines increases toward the rear of the hull.

In this manner, with the right and left knuckle lines 14A formed so as to narrow the width between them gradually from the starting point S to the propeller position P, and then increase the width between them gradually from the propeller position P to the end point E, since the cross-sectional area of the flow channel from the starting point S to the propeller position P is gradually narrowed, the flow is effectively controlled and the hull resistance is effectively reduced.

More specifically, the knuckle lines 14A described above have an inclination from the starting point S to the propeller position P located to the rear so as to be narrowed toward the rear. Therefore, since the knuckle lines 14A have an inclination which does not significantly intersect the flow in the vicinity of the hull, that is, the flow on the rear half portion of the hull changed from being parallel to the hull centerline CL to an angle such that the width of the flow lessens as it goes toward the rear, it is effective for reducing the hull resistance.

The knuckle lines 14A described above control the flow in the vicinity of the hull, inducing the flow toward the center portion of the hull, so that the flow velocity to the region above the propeller 2 is increased, and hence uniformization of the flowing velocity into the propeller 2 is achieved.

Since the width between the left and right knuckle lines 14A described gradually increases from the propeller position P to the end point E, it is effective for reducing the hull resistance. In other words, since the cross-sectional area of the flow channel is gradually increased in the horizontal direction to the rear of the propeller 2, the speed of the flow toward the rear end of the stern is reduced and the pressure at the rear end of the hull is increased. Consequently, the displacement-type marine vessel achieves reduction of the hull resistance.

The angle of inclination gradually increasing the width between the left and right knuckle lines from the propeller position P to the end point E is preferably set to a value no more than 20 degrees, in order to prevent separation of the flow.

Figure 18A:
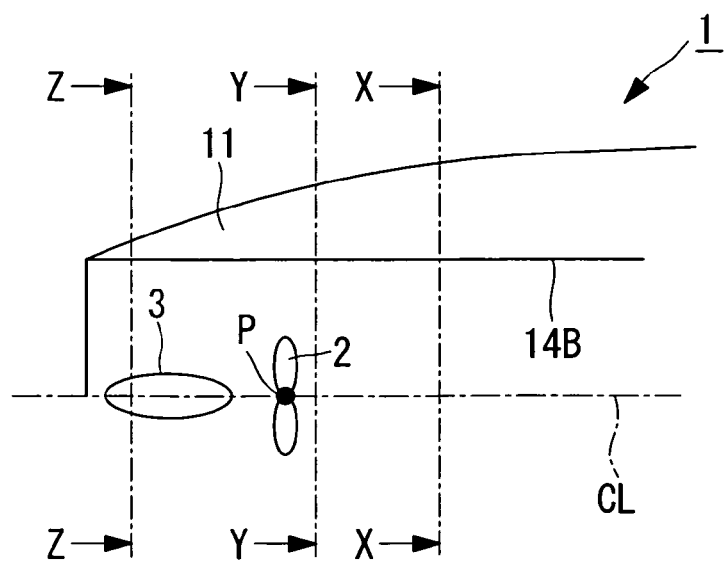
FIG. 18A is a bottom view of the stern side vessel bottom portion illustrating a modification of the seventh embodiment.
Figure 18B:
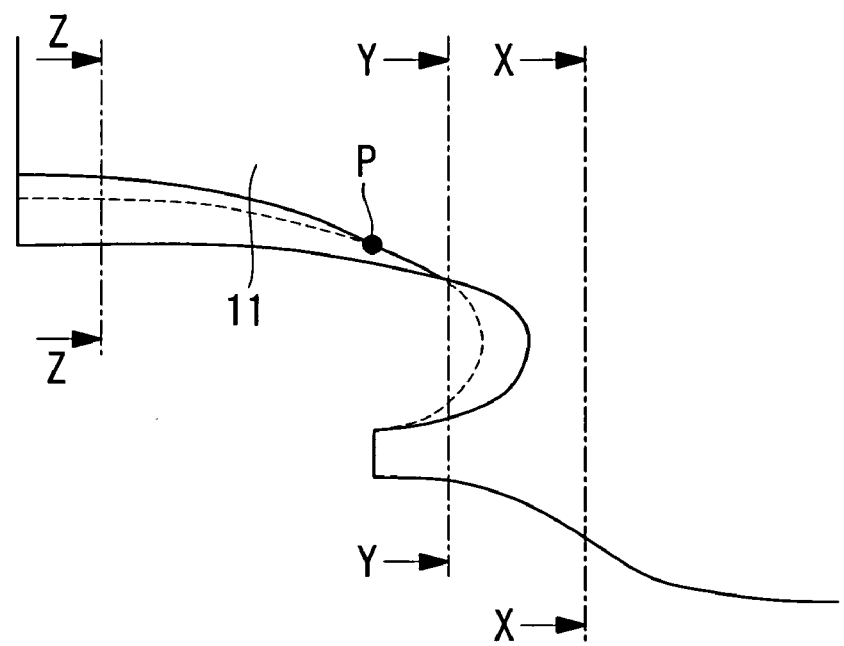
FIG. 18B is a vertical cross-sectional view taken along the centerline of the hull shown in FIG. 18A.
Figure 18C:
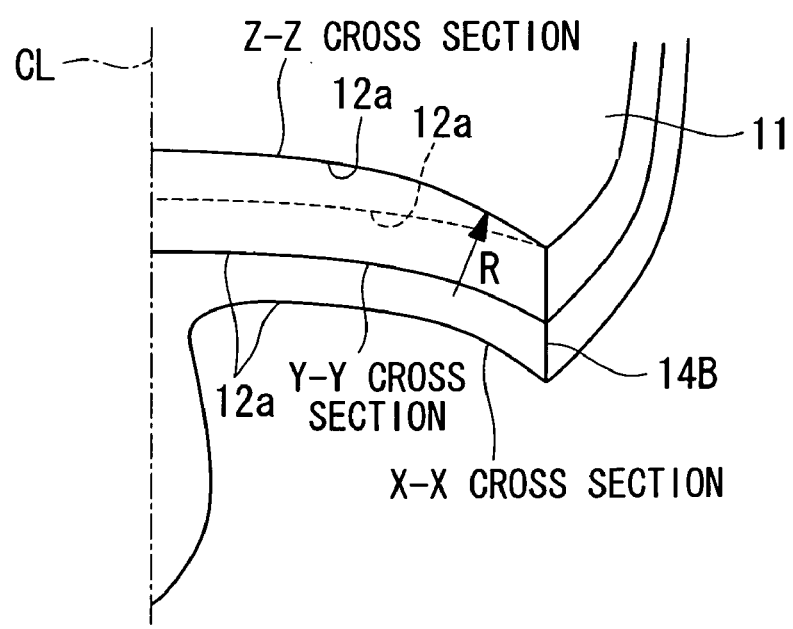
FIG. 18C is a cross-sectional view (cross sections taken along the line X-X, the line Y-Y and the line Z-Z in FIG. 18A and FIG. 18B) showing the stern shape of the displacement-type marine vessel viewed from the stern side in FIG. 18A and FIG. 18B, viewed from the stern side.

Referring now to FIG. 18A to FIG. 18C, a modification of the embodiments described above will be described. The same components as in the embodiment described above are designated by the same reference numerals, and detailed description thereof will be omitted.

In this modification, the frame line 12a formed into the dome shape in the embodiment described above has a dome shape having an increased curvature protruding upward at the rear of the propeller position P.

In other words, in the embodiment described above, the width between the knuckle lines 14A is widened at the rear of the propeller position P to increase the cross-sectional area of the flow channel and, in this modification, the cross-sectional area of the flow channel is also increased in the vertical direction by increasing the height (depth) of the dome shape at the rear of the propeller position P, with P as the boundary for this change from the front side, in the tunnel portion formed by hollowing out the bottom surface of the stern side vessel bottom 11 upward toward the center of the hull.

More specifically, the dome shape in the stern has, as shown in FIG. 18B and FIG. 18C for example, curvature R protruding upward from a linear knuckle line 14B toward the hull centerline CL (see FIG. 18C) d in the Z-Z cross section to the rear of the propeller 2, which is set to be greater than at the propeller. In other words, the dome shape at the stern of the hull 1 has a shape formed by hollowing out the vessel bottom of the hull by a larger (deeper) amount than the unchanged shape shown by a broken line in the drawing (the same curvature as the X-X cross section and the Y-Y cross section).

This dome shape is hollowed out more (deeply) than the conventional shape shown by a broken line the further measurement of the dome is made toward the rear away from the propeller position P along the direction of the vessel length as shown in FIG. 18B.

Although the knuckle line 14B which is a straight line is exemplified in this modification, the invention is not limited thereto and, for example, the knuckle lines 14, 14A described above may be employed.

Consequently, the velocity of the flow toward the rear end of the stern is reduced due to the increase in cross-sectional area of the flow channel at the rear of the propeller 2, and increase in the pressure at the rear end of the stern is achieved. In other words, by setting the hollow-out (the curvature R curving upward) of the dome shape at the tunnel portion formed on the vessel bottom of the hull 1 at the rear of the propeller 2 to be larger than in front of the propeller 2, the cross-sectional area of the flow channel is increased downstream of the propeller 2, so that reduction of the hull resistance is achieved by reducing the flow velocity.

In this manner, since the reduction of the hull resistance is achieved merely by increasing the cross-sectional area downstream of the propeller 2, either the increased width between the knuckle lines 14A or the increased upward curvature of the dome shape may be employed downstream of the propeller 2. Also, the cross-sectional area of the flow channel may be increased downstream of the propeller 2 by combining increased width between the knuckle lines 14A and adequately increased upward curvature of the dome shape.

Eighth Embodiment

Figure 19A:
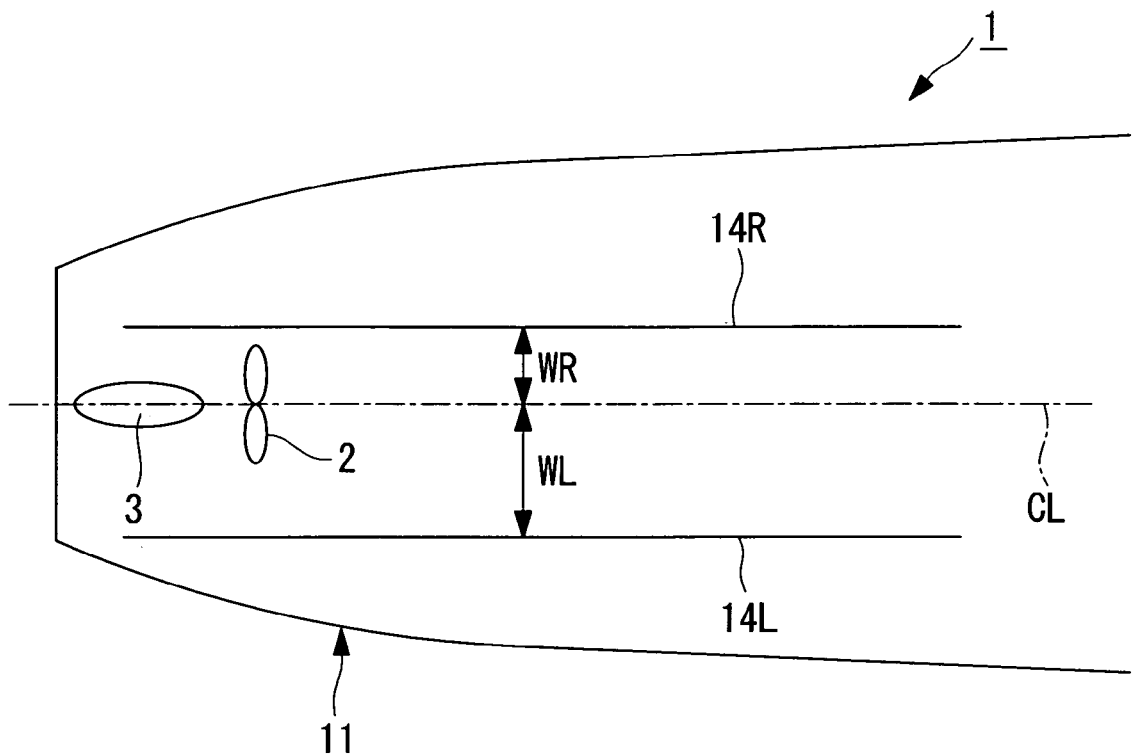
FIG. 19A is a bottom view of the stern side vessel bottom portion showing the stern shape of the displacement-type marine vessel according to an eighth embodiment of the present invention.
Figure 19B:
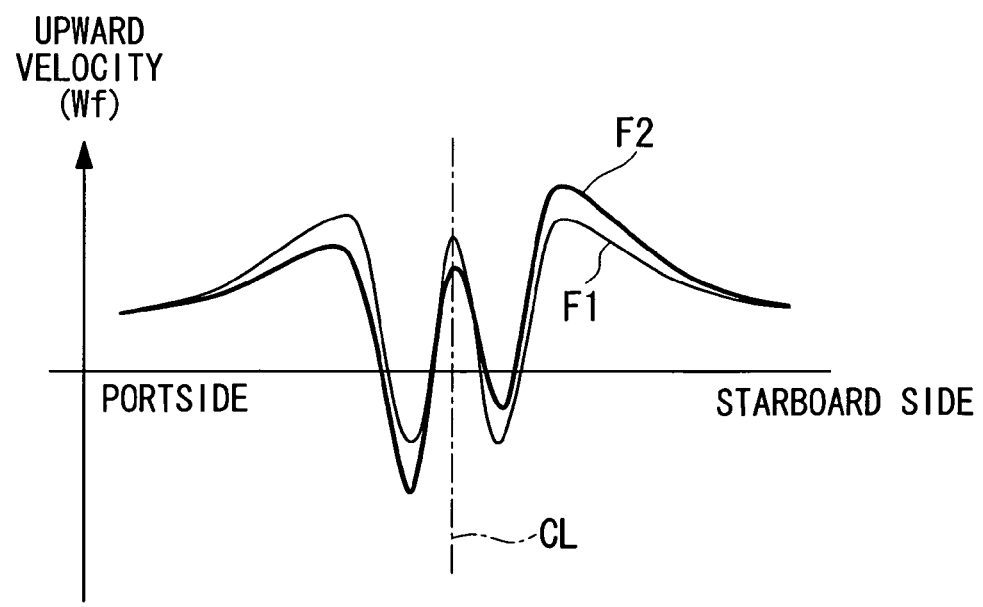
FIG. 19B is a graph showing of the effect of the stern shape shown in FIG. 19A, specifically the upward velocity (Wf) distribution along the direction of the width of the hull.

Referring now to FIG. 19A to FIG. 19B, an eighth embodiment of the stern shape of the displacement-type marine vessel according to the present invention will be described. The same components as in the embodiment described above are designated by the same reference numerals, and detailed description thereof will be omitted.

In this embodiment, the positions of knuckle lines 14L, 14R in the direction of the width of the hull are set to be closer to the centerline of the hull on the downstream side of the direction of rotation of the propeller than the upstream side. In other words, in a bottom view shown in FIG. 19A, assuming that the direction of rotation of the propeller 2 is rightward when viewed from the rear of the hull, the knuckle line 14R on the starboard side, which corresponds to the downstream side of the direction of rotation of the propeller, is positioned closer to the centerline of the hull than the knuckle line 14L on the portside, which corresponds to the upstream side of the direction of rotation of the propeller.

The knuckle lines 14L, 14R in the drawing are shown as straight lines, but they are not limited thereto.

In the usual displacement-type marine vessel having the propeller 2 which turns clockwise, if the position of the knuckle line is provided in lateral symmetry with respect to the hull centerline CL, the upward component Wf of the flow velocity flowing into the propeller becomes laterally symmetrical as shown by velocity line F1 in FIG. 19B.

In contrast, in the, 14R described above, by reducing the width WR between knuckle line 14R and the hull centerline CL on the downstream side of the direction of rotation of the propeller (the starboard side) to be smaller than the width WL between knuckle line 14L and the hull centerline CL on the upstream side (portside) of the direction of rotation of the propeller (WR<WL), the inwardly winding tendency of the flow flowing into the propeller 2 is strengthened on the portside and on the starboard side it is weakened so that an upwardly flowing tendency results. In other words, velocity line F2 shown in FIG. 19B results, and the flow is in the direction opposite from the direction of rotation of the propeller as a whole, whereby the improvement of the propeller efficiency is achieved.

Figure 20A:
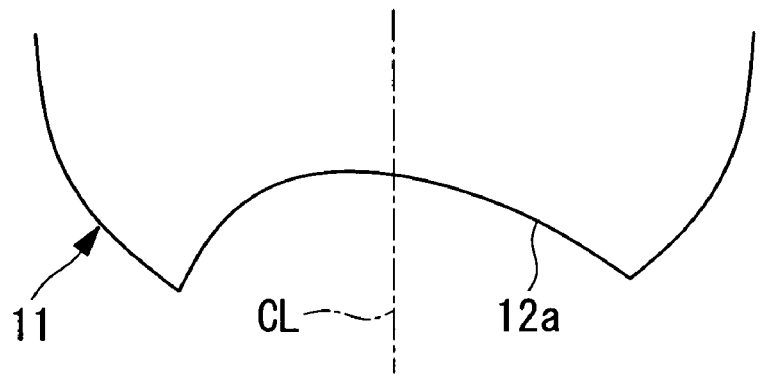
FIG. 20A is a cross-sectional view in the direction of the width of the hull illustrating a modification of the eighth embodiment.
Figure 20B:
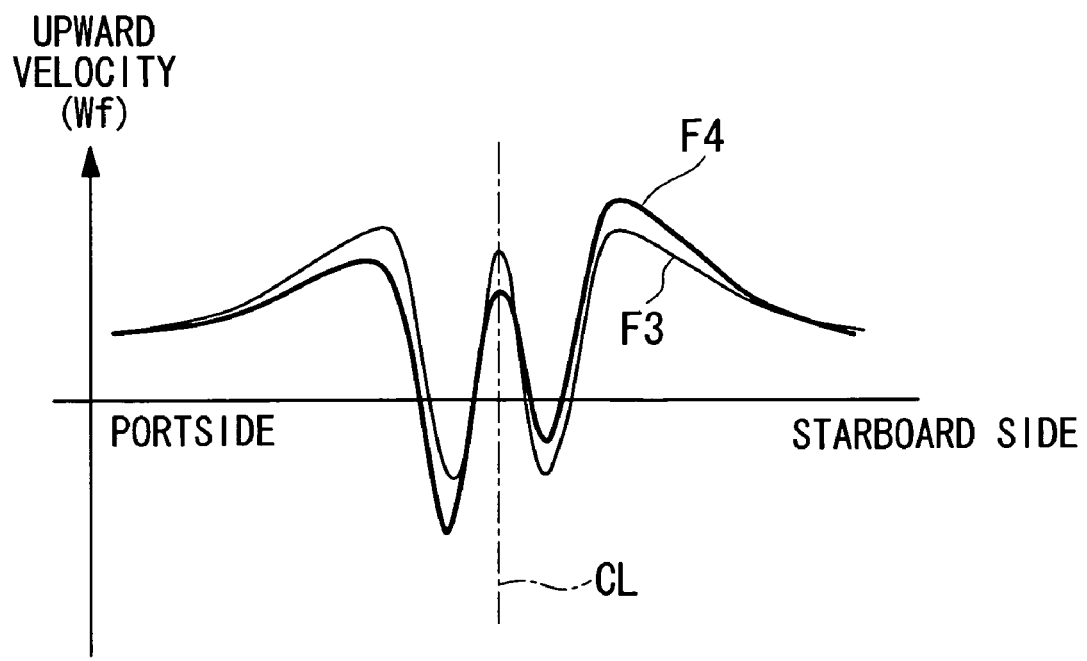
FIG. 20B is a graph showing the effect of the stern shape shown in FIG. 20A, specifically the upward velocity (Wf) distribution along the direction of the width of the hull.

Referring now to FIG. 20A and FIG. 20B, a modification of the embodiments described above will be described. The same components as in the embodiment described above are designated by the same reference numerals, and detailed description thereof will be omitted.

In this modification, the frame line 12a having a dome shape is modified so that the cross-sectional area of the flow channel below the frame line 12a at the side of the hull centerline CL upstream of the direction of rotation of the propeller is larger than at the downstream side thereof. In other words, the cross-sectional shape of the tunnel formed in the stern side vessel bottom 11 is a dome shape more hollowed out on the side of the hull centerline CL upstream of the direction of rotation of the propeller.

FIG. 20A is a lateral cross-sectional view of the hull 1 viewed from the rear of the hull, in which the right side of the drawing on the right side corresponds to the starboard side and the propeller 2 rotates in the clockwise direction. In the stern side vessel bottom 11 of the hull 1 as such, a tunnel of a dome shape where the vessel bottom on the portside of the hull centerline CL is more hollowed out is formed.

In this configuration, a rotational flow in the direction opposite to the direction of rotation of the propeller 2 is generated in the same manner as the embodiment shown above, whereby the improvement of the propeller efficiency is achieved.

In other words, when the dome shape is provided in lateral symmetry with respect to the hull centerline CL, the upward component Wf of the flow velocity flowing into the propeller becomes lateral symmetry as a velocity line F3 shown in FIG. 20B.

In contrast, by employing the dome shape whose vessel bottom on the portside of the hull centerline CL is more hollowed out, the inwardly winding tendency of the flow flowing into the propeller 2 is strengthened on the portside and is weakened on the starboard side, so that an upwardly flowing tendency results on the starboard side. In other words, velocity line F4 shown in FIG. 20B results, and the flow is rotated in the direction opposite to the direction of rotation of the propeller as a whole, whereby the improvement of the propeller efficiency is achieved.

As described above, according to the stern shape of the displacement-type marine vessel of the present invention, reduction of the hull resistance is achieved by accelerating the flow from the position of the propeller 2 to the vessel bottom portion of the stern, and the reduction of the hull vibration is achieved by restraining the propeller cavitation by uniformizing the flow flowing into the propeller 2.

Also, since the amount of exposure of the vessel bottom protrusion from the hull is reduced by installing a vessel bottom protrusion such as the rudder 3 or the POD 30 on the portion of the hull 1 descending from the dome in front of a vessel bottom protrusion or right below the knuckle point 13, reduction of increase in resistance while the ship is traveling due to the vessel bottom protrusion is achieved.

Since the stern shape in the present invention accelerates the flow at the vessel bottom portion of the stern to reduce the vessel bottom resistance, the resistance reduction effect is increased at the wedge member 50 or the like provided at the stern end.

The stern shape of the present invention controls the flow on the rear half portion of the hull effectively and induces the flow on the rear half portion of the hull toward the center portion of the hull, so that the flowing velocity to a portion above the propeller 2 is increased.

Since increase in pressure at the rear end of the hull is achieved by reducing the velocity of the flow flowing toward the rear end of the stern, reduction of the resistance of the hull 1 is achieved.

Since the difference in relative velocity of the flow hitting on the left and the right sides of the front edge of the propeller 2 is reduced, maintenance or improvement of the traveling performance of the displacement-type marine vessel is achieved.

The present invention is not limited to the above-described embodiments, and may be modified appropriately without departing the scope of the present invention, such as combining the respective embodiments described above appropriately.

The invention claimed is:

1. A stern of a displacement-type marine vessel which travels in a velocity range which is below a velocity at which resistance is at its highest value, the stern comprising two knuckle lines respectively disposed on two sides of a hull of the vessel, each knuckle line being configured such that:
the knuckle line extends from a starting point in front of a propeller to an end point behind the propeller;
a first portion of the stern is disposed outwardly of the knuckle line relative to the propeller in a width direction of the stern, the first portion of the stern having a convex curvature; and
a second portion of the stern is disposed inwardly of the knuckle line relative to the propeller in a width direction of the stern, the second portion of the stern being formed into a dome shape having a concave curvature, wherein a length of the second portion having the dome shape is at least 10% of an entire length of the hull of the vessel or at least as long as a diameter of the propeller, and wherein the starting point of the knuckle line is positioned outside a radius of the propeller in the width direction of the stern, and wherein the end point of the knuckle line is spaced apart from the end point of the other knuckle line on the other side of the hull.

2. The stern of the displacement-type marine vessel according to claim 1, wherein the end point of the knuckle line is at an end of the stern.

3. The stern of the displacement-type marine vessel according to claim 1, further comprising a side plate, wherein the convex curvature of the first portion of the stern smoothly joins the side plate.

4. The stern of the displacement-type marine vessel according to claim 3, wherein said knuckle line forms a protrusion between the first portion of the stern and the second portion of the stern, and wherein the first portion includes a concave region in a vicinity of the protrusion.

5. The stern of the displacement-type marine vessel according to claim 1, wherein said knuckle line forms a protrusion between the first portion of the stern and the second portion of the stern, wherein the first portion of the stern and the second portion of the stern are configured such that the convex curvature of the first portion extends to the knuckle line and the concave curvature of the second portion extends to the knuckle line, and wherein the protrusion is a rounded fillet portion which protrudes beyond the first portion and the second portion.

6. The stern of the displacement-type marine vessel according to claim 5, further comprising a protruding portion protruding from the rounded fillet portion.

7. The stern of the displacement-type marine vessel according to claim 1, wherein the knuckle line approaches a centerline of the hull in a direction extending from the starting point to the end point.

8. The stern of the displacement-type marine vessel according to claim 1, wherein the knuckle line approaches a centerline of the hull in a direction extending from the starting point to a position of the propeller and becomes more distant from the centerline of the hull in a direction extending from the position of the propeller to the end point.

9. The stern of the displacement-type marine vessel according to claim 1, wherein the dome shape of the second portion is increased in upward curvature at a rear of the propeller.

10. The stern of the displacement-type marine vessel according to claim 1, wherein the knuckle line is closer to a centerline of the hull on a downstream side of a direction of rotation of the propeller than on an upstream side of the direction of rotation of the propeller.

11. The stern of the displacement-type marine vessel according to claim 1, wherein the dome shape of the second portion defines a flow channel below the stern, and a cross-sectional area of the flow channel is larger on a side of a centerline of the hull which is upstream of a direction of rotation of the propeller than on a side of the centerline of the hull which is downstream of the direction of rotation of the propeller.

12. The stern of the displacement-type marine vessel according to claim 1, wherein a vessel bottom protrusion is mounted to the stern, and wherein the dome shape of the second portion is provided with a descending portion located in front of where the vessel bottom protrusion is mounted.

13. The stern of the displacement-type marine vessel according to claim 1, wherein rudders are installed below the knuckle line.

14. The stern of the displacement-type marine vessel according to claim 1, wherein thrusters are installed below the knuckle line.

15. The stern of the displacement-type marine vessel according to claim 1, wherein a wedge member is provided at an end of the stern.

16. The stern of the displacement-type marine vessel according to claim 1, wherein a portion of the knuckle line is parallel to a centerline of the hull.

17. The stern of the displacement-type marine vessel according to claim 1, wherein the end point of the knuckle line does not overlap the end point of the other knuckle line on the other side of the hull.

18. The stern of the displacement-type marine vessel according to claim 1, wherein the knuckle line does not overlap the other knuckle line on the other side of the hull.

19. The stern of the displacement-type marine vessel according to claim 1, wherein the propeller is arranged entirely within the two knuckle lines.

* * * * *